United States Patent [19]

Snitzer et al.

[11] 4,298,794

[45] Nov. 3, 1981

[54] FIBER OPTIC HOT SPOT DETECTOR

[75] Inventors: Elias Snitzer, West Hartford; Gerald Meltz, Avon, both of Conn.

[73] Assignee: United Technologies Corporation, Hartford, Conn.

[21] Appl. No.: 162,285

[22] Filed: Jun. 23, 1980

Related U.S. Application Data

[63] Continuation-in-part of Ser. No. 71,511, Aug. 30, 1979, abandoned.

[51] Int. Cl.³ .............................................. G02B 5/14
[52] U.S. Cl. ..................................... 250/227; 73/356
[58] Field of Search ................. 250/225, 227, 23 R; 73/355 R, 356; 350/96.29, 148

[56] References Cited

U.S. PATENT DOCUMENTS

| | | | |
|---|---|---|---|
| 3,981,592 | 9/1976 | Williams | 250/227 |
| 4,136,566 | 1/1979 | Christensen | 73/356 |
| 4,151,747 | 5/1979 | Gottlieb et al. | 73/356 |
| 4,201,446 | 5/1980 | Geddes et al. | 350/96.29 |

Primary Examiner—David C. Nelms
Attorney, Agent, or Firm—Richard P. Lange

[57] ABSTRACT

A hot spot detector for a power cable, or the like, includes an optical fiber having a plurality of cores including an input core into which light energy is coupled. The core diameters, spacing, and materials of the cores and the cladding are carefully selected so that cross-talk from the input core to the secondary cores occurs only in the vicinity of the point along the fiber where the hot spot is located. Light energy then propagates along the secondary cores and modal interference causes a beat phenomena producing spatial interference that can be analyzed as energy flow between the secondary cores. By measuring the light intensity patterns emerging from the secondary cores at at least two distinct wavelengths, the location of the hot spot along the fiber can be calculated.

9 Claims, 9 Drawing Figures

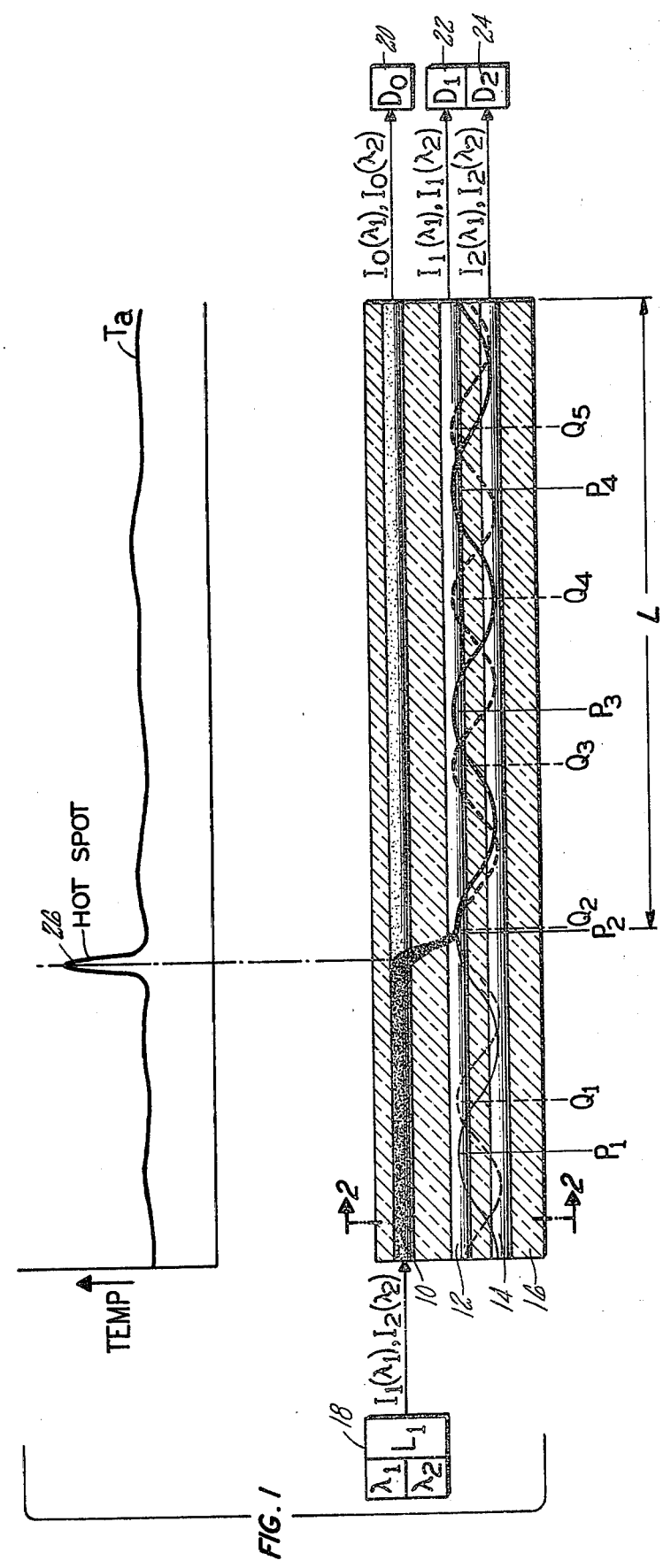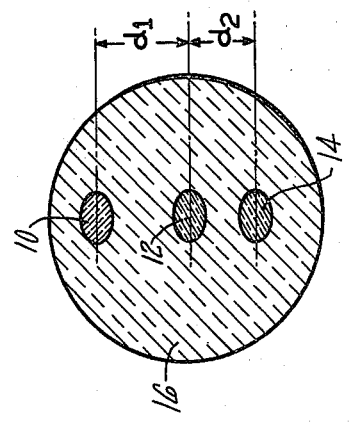

FIBER OPTIC HOT SPOT DETECTOR

This is a continuation-in-part of U.S. patent application Ser. No. 071,511 for FIBER OPTIC HOT SPOT DETECTOR filed Aug. 30, 1979, now abandoned.

DESCRIPTION

1. Technical Field

This device relates generally to optical waveguide sensors, and more particularly, to an optical waveguide having an array of cores particularly shaped and positioned in a common cladding so that the light which cross-talks between the cores changes as a function of temperature thereby acting as a temperature measuring device.

2. Background Art

Optical waveguides have been known for many years and, with the advent of low loss glasses, devices incorporating optical waveguides have been employed in ever-increasing numbers, in many different fields such as communications and monitors. An optical waveguide typically consists of a dielectric core fabricated from a glass, or the like, having a certain refractive index, and this core is surrounded by a second material, also normally glass or the like, having a lower refractive index. This surrounding material is generally known as the cladding. A beam of light is guided by this composite structure so long as the refractive index of the material comprising the core exceeds the refractive index of the material forming the cladding. A light beam within the core is guided generally along the core axis by reflection at the boundary between the core and the cladding.

A number of different designs for optical waveguides have been proposed including the multimode step index profile, the single mode profile, and the multimode graded index profile. Where a single mode is desired, the single mode optical waveguide is used. In such a waveguide, the diameter of the core is typically less than 10 $\mu$m and the difference between the refractive indices of the core and the cladding is on the order of $10^{-3}$. As a result only the lowest order mode will be supported in such a waveguide.

Optical cables have also been fabricated which include multiple cores disposed in numerous different arrays and positioned within a common cladding. One such disclosure is contained in U.S. Pat. No. 4,148,560 issued Apr. 10, 1979 to D. Margolis for OPTICAL GUIDES. This disclosure is directed toward an assembly including a plurality of fibers embedded in an encapsulating material. This particular patent shows an optical bundle positioned between two reinforcing wires and embedded in a protective sheath of plastic material.

The phenomena known as "cross-talk" between cores in a common cladding occurs when the light energy propagating along one core is coupled to an adjacent core. This occurs because, as is known, the light energy is not totally confined by the boundary between the core and cladding but, in fact, it penetrates to a small degree into the cladding.

It has been recognized that the cross-talk phenomena in a waveguide having at least two cores will vary to some extent as a function of temperature. For example, in a treatise entitled OPTICAL WAVEGUIDES by N. S. Kapany and J. J. Burke published in 1972, it was recognized that in two closely spaced glass fiber cores positioned in a cladding experienced an optical beat phenomena. Beginning on page 255, there is an experiment described in which the optical beat phenomena of the aforementioned optical waveguide varies in response to changes in the ambient temperature.

A temperature sensor employing an optical waveguide is described in U.S. Pat. No. 4,151,747 issued May 1, 1979 to M. Gottlieb et al for MONITORING ARRANGEMENT UTILIZING FIBER OPTICS. A temperature sensor consists of an optical waveguide. A light source is positioned at one end of the waveguide and a detector is located at the other end. Temperature changes are then perceived by variations in the light received at the detector. Another embodiment includes two optical fibers positioned adjacent each other in a common cladding. Input light is conducted along the length of one fiber and passes out of the wall of that fiber in an amount which varies with the temperature of the fiber. The second fiber is in sufficiently close proximity to the first fiber for capturing at least some of the light passing out of the first fiber. By monitoring the light received in the second fiber, a determination can be made as to the amount of temperature variation. Of interest is a copending patent application U.S. application Ser. No. 071,512 entitled FIBER OPTIC TEMPERATURE/STRAIN SENSOR filed Aug. 30, 1979 by the same applicants. That disclosure is directed toward a multicore optical fiber having a plurality of cores positioned across the diameter of a common cladding. The materials, spacing and shape of the cores in the array are so selected to enhance cross-talk between adjacent cores. By the proper selection of materials, core size, and shape, the cross-talk between adjacent cores can be optimized to respond to changes in either temperature or pressure/strain of the fiber. The change in temperature, pressure or strain can then be determined by measuring the relative intensity of light emerging from the different cores of the fiber. If optimized to respond to temperature, a high degree of temperature sensitivity can be provided over a large unambiguous range. Alternatively, by proper selection of materials, spacing, and core size, cross-talk can be made temperature insensitive so that the intensity of light emerging from the several cores of the fiber is only a function of the strain experienced by the fiber.

DISCLOSURE OF INVENTION

According to the present invention a temperature responsive optical fiber having an array of closely spaced cores in a common cladding is disclosed across which light couples as a function of temperature. A light source at one end of the waveguide illuminates a single core while an array of detectors measures the intensity of light emerging from each of the cores. As the temperature of the fiber exceeds a predetermined threshold value, light is coupled to the secondary cores by means of cross-talk indicating the existence of a hot spot. By measuring the relative intensity pattern of cross-talk emerging from the fiber at two or more different wavelengths the precise location along the cable of the hot spot can be determined.

A particular feature of the optical waveguide according to the present invention is that it employs an arrangement of an input core and secondary cores in a common cladding to sense both the existence of, and the precise location of, a hot spot along a length of cable. The material of which the input core is made is different from the material constituting the secondary cores. The input core material of refractive index $n_3$ has a value for the relative thermal coefficient of refractive index ($n_3^{-1} dn_3/dT$), defined as $\zeta_3$, which differs sufficiently from the relative thermal coefficient of refractive index ($n_1^{-1} dn_1/dT$), defined as $\zeta_1$, for the secondary cores of refractive index $n_1$ so that for the radii chosen for the cores, $a_3$ and $a_1$, there is no significant cross-talk at normal ambient temperatures because at these temperatures the phase velocities for propagation of the $HE_{11}$ mode in these two categories of cores is sufficiently different in relation to their spacing to effectively uncouple the input core from the secondary cores. Furthermore, the materials and radii of the input and secondary cores, and the spacing between the input core and the first secondary core are so chosen that an increase in temperature of a short length of fiber to a value in excess of a predetermined value will cause the phase velocities for light propagation in the input core and the first secondary core to become sufficiently close in value to give measurable cross-talk between them. By measuring the relative magnitudes of the intensities emerging from the different wavelengths, the precise location of the hot spot can be determined.

The foregoing and other objects, features and advantages of the present invention will become more apparent from the following description of preferred embodiments and accompanying drawings.

BRIEF DESCRIPTION OF DRAWINGS

FIG. 1 is an enlarged illustration, in axial section, of one embodiment of an optical fiber according to the present invention;

FIG. 2 is a cross-sectional view of the optical fiber taken along line 2—2;

BEST MODE FOR CARRYING OUT THE INVENTION

Figure 4:
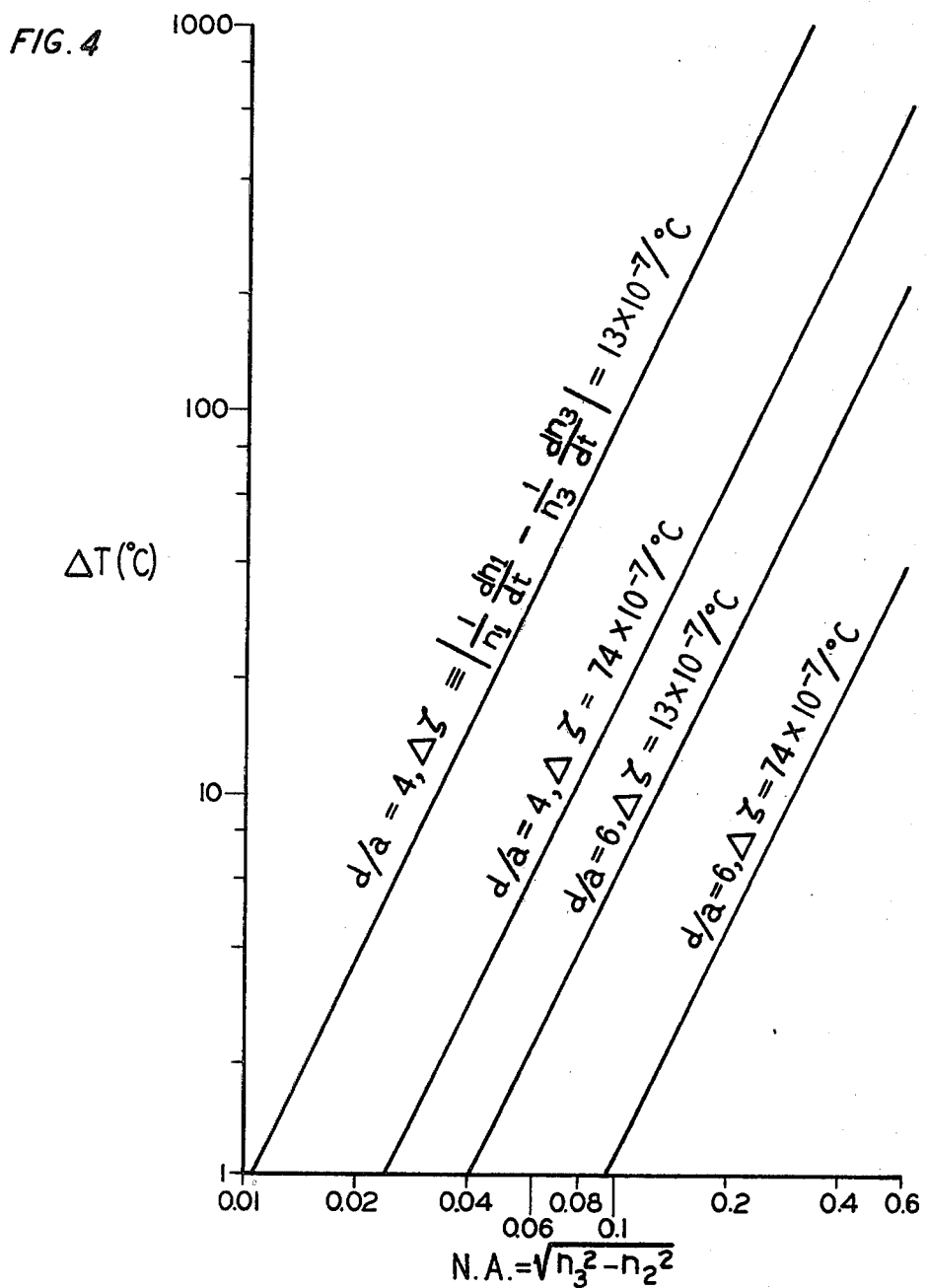
FIG. 4 is a graph showing the change in temperature necessary to make the phase velocities for the input core and the first secondary core equal to one another as a function of the numerical aperture of the input core for various core spacings and relative temperature coefficients of refractive index.

Referring to FIG. 1, there is seen one embodiment of an optical fiber according to the present invention whose characteristics have been optimized for use as a temperature sensor so that the fiber can be used, for example, as a hot spot detector in a power cable or the like. The optical cable includes an input core 10 and at least two secondary cores, secondary core 12 and secondary core 14, all of which extend along the entire length of the cable. A cladding 16 totally surrounds all of the cores along the entire length of the cable. A light source 18 emits light energy having a wavelength $\lambda_1$ or $\lambda_2$ which is coupled only into the input core 10. As is known, so long as the phase velocity for propagation in core 10 differs sufficiently from the phase velocity for propagation in core 12, light energy entering core 10 will emerge only at the output end where it impinges detector 20. If a hot spot along the fiber occurs, the indices of refraction for core 10 and cores 12 and 14 change such as to make the phase velocities the same for propagation in these cores and cross-talk takes place which results in light impinging detectors 22 and 24, this phenomena being discussed in greater detail hereinafter.

The number of distinct modes that will exist in each core is a function of the refractive indices of both the core material and the cladding material, the dimensions of each core, and the wavelength of light propagating along the waveguide. The number of modes that can exist is determined by the V parameter, which for a circular cross section for the core is given by the relationship:

$$V = 2\pi(a/\lambda)NA, \quad (1)$$

and $$NA = \sqrt{n_1^2 - n_2^2}, \quad (2)$$

where a is the radius of the core, $\lambda$ is the light wavelength, $n_1$ is the refractive index of the core and $n_2$ is the refractive index of the cladding. Consistent with conventional optical terminology, the numerical aperture (NA) is related to the maximum angle with respect to the core axis that a ray of light through the axis can make and still be coupled into the fiber at a perpendicular end face. For enhancing cross-talk between adjacent cores an elliptical cross section is preferred, and it is sufficient to take Equation (1) for the V parameter but with the value a as the goemetric average of the semi-major and the semi-minor axis of the elliptical core dimensions. If V is less than 2.405 (the first order zero of the Bessel function $J_0$) then only the lowest order mode, known as the $HE_{11}$ mode, can be supported. For values of V that are much larger than 2.405, this occurring when the average diameter, $2a$, of each core is much larger or the difference between the refractive index of each core and that of the cladding is greater, then many modes will be supported by the waveguide.

A significant feature of the present invention is the use of thermal dependence of cross-talk between the input core 10 and the secondary cores 12 and 14 to identify both the existence of, and to measure the location of a hot spot along the length of the fiber. The material from which the cores and the cladding are made are known so that the refractive indices of the input core, $n_3$, the secondary cores, $n_1$, and the cladding, $n_2$, are all known. The spacing separating each core is relatively small while the outer diameter of the cladding is large so that interactions at the boundaries formed by the outer wall of the cladding does not affect the light distribution within the cores. It is also necessary that the light propagate in the input core 10 and the secondary cores 12 and 14 in only the lowest order $HE_{11}$ mode, in accordance with the aforementioned Equation (1).

Still referring to FIG. 1, if a hot spot 26 occurs at a specific point along the length of the cable, cross-talk occurs between the input core 10 and the secondary core 12 and further down the fiber to core 14 by additional cross-talk. Light energy now propagates along the waveguide in all of the cores and modal interference in the secondary cores 12 and 14 causes a beat phenomena or spatial interferences that can be analyzed as an energy flow between the secondary cores.

Figure 3A:
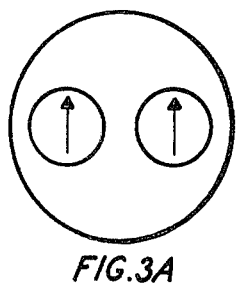
FIGS. 3A–3D are illustrations of the possible modes that might exist in a pair of secondary cores.
Figure 3B:
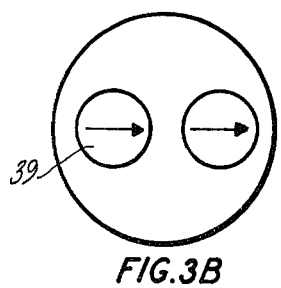
Figure 3C:
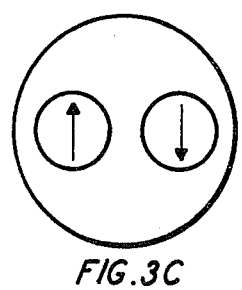
Figure 3D:
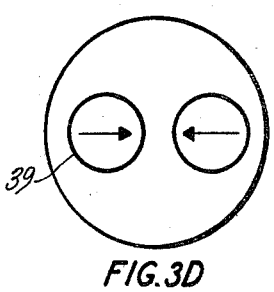

The normal modes in the two identical secondary cores are linear combinations of the lowest order $HE_{11}$ single core excitations. A normal mode is a field distribution which propagates along the fiber axis without change in its cross-sectional intensity pattern. The z (fiber length) and time dependencies of a normal mode are given by a simple harmonic function Re $[\exp\{i(\omega t - \beta_i z)\}]$, where Re $[\ldots]$ denotes the real part of the quantity in brackets and the propagation constant $\beta_i$ has a subscript i to designate the various possible single core $HE_{11}$ mode combinations. There are four distinct field distributions which constitute the possible normal modes of the twin-core fiber. They consist of two orthogonally polarized, symmetric and anti-symmetric pairs (see FIG. 3). Let $\psi_i$, $i=1, 2, 3, 4$, designate the amplitudes of the four normal modes. Illumination of a single core is equivalent to excitation of a pair of modes; namely, a symmetric and anti-symmetric combination having the same polarization. If $\beta_1$ and $\beta_3$ are taken as the propagation constants for the symmetric mode, FIG. 3B, and the anti-symmetric mode, FIG. 3D, the division of energy between the two cores is a function of the difference $2\Delta\beta = \beta_1 - \beta_3$ and the distance from the point of initial cross-talk. Let only the left core 39 be excited initially with polarization along the line joining the core centers. As a distance $z_1 = \pi/(2\Delta\beta)$ from the point of initial cross-talk, the two composite modes, FIG. 3B and FIG. 3D, are exactly 180° out of phase and all the light is in the right core. For a distance less than $z_1$, some of the light is in both cores, and similarly for greater distances where the phase difference between modes continues to increase. At a distance $z_2 = 2z_1$, the composite modes are exactly in phase, as they were at the initial position; and the light returns to the left core. As the light propagates along the twin-core fiber, mode interference causes a beat phenomena producing spatial interference that can be thought of as energy interchange between cores. The beat length $\Lambda$ is $\pi/\Delta\beta$. A change in temperature in general causes a change in $\Lambda$ and an expansion or contraction of the fiber length L. The net effect is a corresponding variation in the beat phase $\phi \equiv \Delta\beta \cdot L$ at the end of the fiber of initial length L. The value of the beat length is given by:

$$\Lambda = \frac{\pi a n_1}{NA} \frac{1}{F(V, d/a)} \quad (3)$$

where $$F = (U^2/V^3) K_0(Wd/a)/K_1^2(W) \quad (4)$$

$$W = (V^2 - U^2)^{\frac{1}{2}} \quad (5)$$

$$U = (1 + \sqrt{2})V/[1 + (4 + V^4)^{\frac{1}{4}}] \quad (6)$$

The $K_0$ and $K_1$ are the modified Hankel functions of order zero and one, respectively, and d is the center-to-center separation between cores.

Continuing with the two cylindrical core fiber, next consider the case where the two cores have different radii, $a_1$ and $a_3$, and different refractive indices $n_1$ and $n_3$. Throughout this discussion $n_2$ refers to the index of refraction of the common cladding. Equations (1), (2), (5), and (6) give the values of $V_1$, $W_1$, and $U_1$ in terms of $\lambda$, $a_1$, $n_2$ and $n_1$. A similar set of equations hold for $V_3$, $W_3$ and $U_3$ in terms of $\lambda$, $a_3$, $n_2$ and $n_3$. The phase refractive index $n_{p1}$ is defined in the usual way as the velocity of light in vacuum divided by the phase velocity for light propagation in core 1 as:

$$n_{p1} = [n_1^2 - (\lambda U_1/2\pi a_1)^2]^{\frac{1}{2}} \quad (7)$$

A similar expression holds for $n_{p3}$ but with $n_1$, $a_1$, and $U_1$ replaced by $n_3$, $a_3$, and $U_3$, respectively. For two cores in a common cladding in which the phase refractive indices differ, there will be less than complete transfer of light energy between the cores as light propagates down the fiber. For cores that are widely spaced so that the interaction is weak (associated with a long beat length), with a sufficient difference in $n_{p1}$ and $n_{p3}$ there can be very little cross-talk, i.e., the cores are in effect decoupled. If initially all the light is in core 3 with intensity $I_0$, the maximum light intensity $I_m$ that will be coupled to core 1 at any distance down the fiber is given by:

$$\frac{I_m}{I_0} = \left\{ 1 + \frac{\pi^2(n_{p3} - n_{p1})^2}{\lambda^2} \left(\frac{NA_3}{n_3 a_3}\right)^{-1} \left(\frac{NA_1}{n_1 a_1}\right)^{-1} \frac{1}{F_{31}^2} \right\}^{-1} \quad (8)$$

where $$F_{31} = \frac{U_3 U_1}{(V_3 V_1)^{3/2}} \frac{K_0(W_3 d/a_d)}{K_1(W_3) K_1(W_1)} \quad (9)$$

In the present invention the input core is taken as core 3 and the first secondary core as core 1 for the above description. The core radii, $a_1$ and $a_3$, the refractive indices, $n_1$ and $n_3$, and the relative thermal coefficients of refractive index, $\zeta_1 = n_1^{-1} dn_1/dT$ and $\zeta_3 = n_3^{-1} dn_3/dT$, are chosen such that the phase refractive indices $n_{p1}$ and $n_{p3}$, are equal at a preset temperature, which is chosen as a convenient temperature in the region between the lowest temperature that would be considered as a hot spot and the upper temperature limit expected at the hot spot. Referring again to FIG. 1, at the hot spot cross-talk occurs from the input core to the first secondary core at the hot spot. At positions away from the hot spot, both before and after the hot spot is encountered, these two cores are in effect decoupled with no cross-talk occurring between them.

To provide an example of the temperature change that the present invention is capable of recognizing in the hot spot refer to FIG. 4. The data shown is for the special case where the two radii $a_3$ and $a_1$ were both taken equal to a. At the hot spot temperature $n_3$ is taken equal to $n_1$. FIG. 4 shows the temperature change $\Delta T(°C.)$ required as a function of $NA_3$ for the cross-talk $I_m/I_0$ (Equation (8)) to increase from less than 1% at the ambient temperature to 100% in the region of the hot spot. The curves in FIG. 4 are given for different values of d/a and $\Delta\zeta \equiv \zeta_1 - \zeta_3$.

After the cross-talk occurs from the input core to the first secondary core, further cross-talk along the fiber takes place between the secondary cores. From a measurement of the ratio of light intensities in the secondary cores at the exit face of the fiber, the possible positions at which the initial cross-talk from the input core occurred can be identified. These positions are functions of the wavelength of the light used (Equations (1) and (3)). Referring to FIG. 1, there is schematically shown the predicted possible positions $P_1$, $P_2$, —$P_4$ for wavelength $\lambda_1$. At wavelength $\lambda_2$, the predicted possible positions are shown as $Q_1$, $Q_2$—$Q_5$. The two wavelengths predict the same possible position only at $P_2$ or $Q_2$; hence this is the position of the hot spot from the data provided by the light intensities $I_1$ and $I_2$ at the two wavelengths $\lambda_1$ and $\lambda_2$. If it is desired to increase the fiber length over which an unambiguous prediction of the hot spot position can be made, additional secondary cores can be added with associated detectors or additional wavelengths can be used. An example of the latter is given below. Choose materials for the input core and two secondary cores such that at the hot spot temperature the core refractive index is n=1.5 and the NA=0.1. At $\lambda$=0.6376 μm the core radii give V values of 2.3. For d/a for the two secondary cores the beat length at $\lambda_1$=0.6376 μm is $\Lambda$=20 cm, at $\lambda_2$=0.6307 the beat length $\Lambda_2$=22 cm, and at $\lambda_3$=0.6188 μm the beat length $\Lambda_3$=26 cm. The length over which an unambiguous calculation of hot spot position can be obtained is 20 (10×11×13)=236 meters.

Consider next the effect of a change in ambient temperature on the predicted location of the hot spot. If the ambient temperature changes there can be a change in beat length at a given wavelength. For two circular cores in a common cladding, the rate of change of beat phase with temperature is given by:

$$\frac{d\phi}{dT} = \frac{(n_1^2 - n_2^2)^{\frac{1}{2}}}{n_1} \frac{L}{a} V \frac{dF}{dV} [\alpha + \zeta] \quad (10)$$

where $\alpha$ and $\zeta$ are, respectively, the thermal coefficient of linear expansion and the relative thermal coefficient of the index of refraction ($n^{-1}dn/dT$) for both core and cladding, i.e., these material properties have been assumed to be the same for the core and cladding in the present discussion. To remove the ambiguity associated with a change in ambient temperature, the ambient temperature can be measured and Equation (10) used to correct the results. The temperature measurement can be done by standard methods such as thermocouples, thermistors, etc., or by sending light into the first secondary fiber and observing its cross-talk to the other secondary fibers by the teaching in the copending patent application U.S. application Ser. No. 071,512 entitled FIBER OPTIC TEMPERATURE/STRAIN SENSOR filed Aug. 30, 1979 by the same applicants as this patent application. Alternatively, the secondary cores can be chosen such that in relation to the cladding and core spacing the cross-talk in the secondary cores is made to be temperature independent by the teachings in the copending patent application U.S. application Ser. No. 071,512 entitled FIBER OPTIC TEMPERATURE/STRAIN SENSOR filed Aug. 30, 1979 by the same applicants as this patent application.

If the assumption is made that the parameters $\alpha$ and $\zeta$ of the materials are the same for the secondary cores and cladding, the condition that the beat phase $\phi$ be independent of ambient temperature is given by:

$$(dF/dV)=0. \quad (11)$$

This is the same condition that applies for the beat phase to be independent of wavelength. Hence, a hot spot detector independent of ambient temperature based on observing the change in cross-talk with wavelength cannot be made with a fiber in which the materials from which the secondary cores and cladding have identical values for $\alpha$ and $\zeta$. If $\alpha$ and $\zeta$ differ for the cores and cladding, it is possible to make $\phi$ be independent of temperature but still depend on the wavelength. Alternatively, $\alpha$ and $\zeta$ can be the same for the secondary cores and cladding, but a second cladding is fused onto the outside of the fiber. For a proper choice of material and thickness of the second cladding and choices for the secondary cores and first cladding materials and their geometries, the beat phase for cross-talk between secondary cores can be independent of ambient temperature but also show a dependence on wavelength. These methods for obtaining a hot spot detector independent of ambient temperature do not affect the previously stated considerations relating to the geometry and materials properties of the primary core and its relation to the first secondary core.

Referring again to FIG. 2, the two identical secondary cores 12 and 14 each have a nominal radius $a_1$ and center-to-center spacing $d_2$ in the uniform cladding 16. The materials parameter for the secondary cores 12 and 14 are $n_1$, $\alpha$ and $\zeta_1$ and the parameters for the cladding 16 are $n_2$, $\alpha_2 = \alpha$, and $\zeta_2$, i.e., only the temperature coefficients for the refractive indices are taken as different for the secondary cores 12 and 14 and the cladding 11.

The dependence of the beat phase on temperature and wavelength can be written as:

$$\frac{\delta\phi}{\phi} = \frac{1}{\phi} \frac{d\phi}{dT} \delta T + \frac{1}{\phi} \frac{d\phi}{d\lambda} \delta\lambda \quad (12)$$

where:

$$\frac{1}{\phi} \frac{d\phi}{dT} = \frac{n_2^2}{n_1^2 - n_2^2}(\zeta_1 - \zeta_2) + \quad (13)$$

$$\frac{V}{F} \frac{dF}{dV}\left[\alpha + \zeta_1 + \frac{n_2^2}{n_1^2 - n_2^2}(\zeta_1 - \zeta_2)\right]$$

and:

$$\frac{1}{\phi} \frac{d\phi}{d\lambda} = -\frac{V}{F} \frac{dF}{dV} \frac{1}{\lambda} \quad (14)$$

The derivative of $\phi$ with respect to temperature in Equations (12) and (13) are taken for a fixed wavelength $\lambda$, and, conversely, the $d\phi/d\lambda$ is for fixed T. The condition for temperature independent cross-talk between the secondary cores 12 and 14 is given by setting the right side of Equation (13) equal to zero, which leads to the requirement:

$$\left.\frac{V}{F} \frac{dF}{dV}\right|_0 = -\frac{n_2^2(\zeta_1 - \zeta_2)}{(n_1^2 - n_2^2)\alpha + n_1^2\zeta_1 - n_2^2\zeta_2} \quad (15)$$

The wavelength dependence of the beat phase between the secondary cores 12 and 14 for no dependence on the ambient temperature is given by substituting from Equation (15) into Equation (14) to give:

$$\left.\frac{1}{\phi} \frac{d\phi}{d\lambda}\right|_0 = \frac{n_2^2(\zeta_1 - \zeta_2)}{(n_1^2 - n_2^2)\alpha + n_1^2\zeta_1 - n_2^2\zeta_2} \frac{1}{\lambda} \quad (16)$$

The vertical bar with a zero subscription specifies zero temperature dependence.

Figure 5:
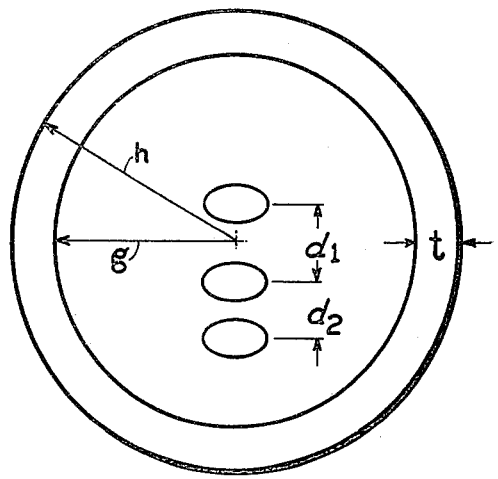
FIG. 5 is an end view of another embodiment of an optical fiber according to the present invention, this embodiment having a second cladding fused on the first cladding; coefficient of thermal expansion than the first cladding.

Referring now to FIG. 5, there is seen a double clad embodiment of an optical fiber according to the present invention. The second cladding 50 is shown on the optical fiber which has a primary core 52, two secondary cores 54 and 56 and a first cladding 58. The materials forming the secondary cores 54 and 56 and the cladding 58 can have the same values for $\alpha$ and $\zeta$, or if these values are different for the secondary cores and the cladding (i.e., $\alpha_1 \neq \alpha_2$ and $\zeta_1 \neq \zeta_2$), the beat phase can be made dependent on wavelength but independent of temperature in a different way. This is done by fusing the second cladding 50 of thickness t onto the outside of the first cladding 58, as shown in FIG. 5. The radius of the first cladding is g, and the outer radius of the second cladding is h, h = g + t. Although the secondary cores 54 and 56 and first cladding 58 would have thermal expansion coefficients that are different, there is little loss in generality to assume that $\alpha_1 = \alpha_2$. Let the thermal expansion coefficient of the second cladding be $\alpha_4$. The Youngs modulii E and the Poisson's ratios $\nu$ are each assumed to be the same for all regions. The condition for the beat phase for cross-talk between secondary cores to be independent of the ambient temperature is then:

$$\frac{V}{F}\frac{dF}{dV}\bigg|_0 = -\frac{(1+\nu)(\alpha_4 - \alpha_2)(1 - g^2/h^2) + 2(1-\nu)n_2^2(n_1^2 - n_2^2)^{-1}(\zeta_1 - \zeta_2)}{(1-3\nu)(\alpha_4 - \alpha_2)(1 - g^2/h^2) + 2(1-\nu)[\alpha_2 + \zeta_1 + n_2^2(n_1^2 - n_2^2)^{-1}(\zeta_1 - \zeta_2)]} \quad (17)$$

This expression is derived by applying the boundary conditions for the double clad configuration. (See, for example, "Elements of Thermal Stress Analysis" by David Brugreen, C. P. Press, Jamaica, N.Y., 1971, pp. 239–246.) The wavelength dependence for the beat phase for cross-talk between the secondary cores 54, 56, where the second cladding 50 is chosen such as to be independent of ambient temperature, is given by substituting for (V/F) (dF/dV) from Equation (17) into Equation (14).

Figure 6:
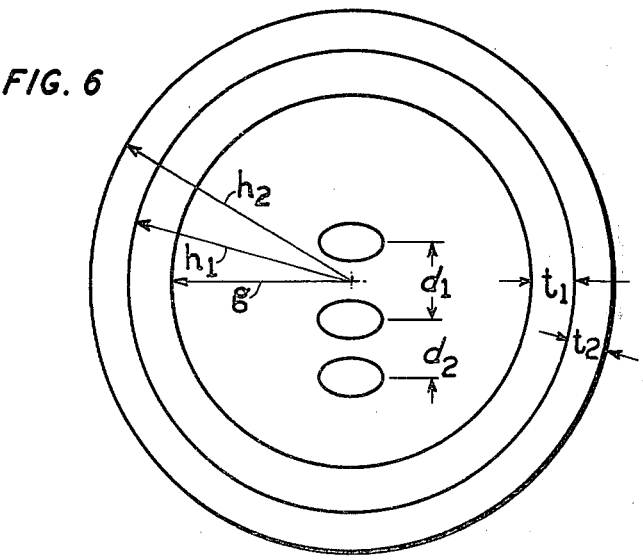
FIG. 6 is an end view of yet another embodiment of an optical fiber according to the present invention, this embodiment having a second and third cladding surrounding the first cladding.

Referring finally to FIG. 6, there is seen an embodiment of the present invention which includes a triple clad optical fiber that functions as a hot spot detector. A primary core 60 and two secondary cores 62 and 64 are surrounded by a first cladding 66. In turn, a second cladding 68 surrounds the first cladding 66 and a third cladding 70 is positioned on the outside of the second cladding. This embodiment is particularly advantageous where a low loss in the optical fiber is important, such as in telecommunication calbes or other devices where light propagates long distances in the optical fiber. To obtain low loss optical fibers, the glasses frequently include high percentages of fused silica and such a material inherently has a low expansion coefficient. As mentioned above, in order to obtain the different expansion coefficient in the second cladding 68, it is necessary to use a material with a higher coefficient of thermal expansion. This is undesirable because it puts the outer surface of the finished fiber under tension and creates the potential for fracture in the fiber. The third cladding 70 of this triple clad embodiment is formed from a material with an expansion coefficient $\alpha_5$ that is less than the expansion coefficient $\alpha_4$ for the second cladding 68. The thicknesses of the second cladding 68 and third cladding 70 are selected in relationship to the radius of the first cladding 66 so as to provide the necessary temperature independence and still obtain the required dependence on wavelength, as discussed hereabove.

The herebefore described embodiments of an optical fiber according to the present invention have included at least two secondary cores in addition to the input core. However, it should be understood that two secondary cores are not necessarily required and, in fact, an optical fiber which include the primary core and only one secondary core is particularly well suited to some application, such as a temperature monitor or the like, where a distance determination is not needed. Such an optical fiber would operate as heretofore described but, because there is only one secondary core, light which cross-talks from the input core indicates that temperature along the optical fiber has exceeded, or dropped below, the preselected value. There is no need for, and one secondary core would not provide, an indicator of exactly what point along the fiber the cross-talk occurred. A detector located at the end of the secondary core would then respond to the received light intensity to provide an output signal indicating that temperature had exceeded, or dropped below, such preselected temperature level.

Although this invention has been shown and described with respect to a preferred embodiment, it will be understood by those skilled in this art that various changes in form and detail thereof may be made without departing from the spirit and scope of the claimed invention.

We claim:

1. A hot spot detector, comprising:
   means including an optical fiber having an input core and at least two secondary cores in a common cladding, said secondary cores being shaped and positioned to allow cross-talk therebetween, said input core and each of said secondary cores and said cladding being dimensioned and fabricated from such materials so as to support only the lowest order mode;
   source means for presenting light of a predetermined wavelength for coupling into said input core;
   detector means for receiving light of a predetermined wavelength emerging from said secondary cores; and
   whereby if the temperature at any point along the length of said optical fiber exceeds a preselected value, light propagating along said input core cross-talks to said secondary core at such point, and the location of point along said optical fiber is related to the intensity of light emerging from said secondary cores.

2. A hot spot detector according to claim 1, wherein said source means can generate light of at least two wavelengths, and wherein said detector is a photoresponsive device that measures the relative intensities of each of said predetermined wavelengths, and wherein the light propagating along said secondary cores results in modal interference causing a beat phenomena that produces light exchange between the secondary cores.

3. A hot spot detector according to claim 1, wherein said input core and said secondary cores and the relationship between the nominal radius of said input core and said secondary core, the refractive indices of the materials of said input and secondary core, and the relative thermal coefficients of refractive index of the materials of said input core and said secondary core are such that the phase refractive indices are equal at the temperature at which the cross-talk is to occur between said input core and secondary core and the phase refractive indices for the input and secondary cores are unequal at temperatures lower than that at which said cross-talk occurs.

4. A hot spot detector according to claim 1, wherein the refractive indices and the relative thermal coefficients of refractive index of said secondary cores and said cladding are such that the beat phase for the output light due to cross-talk therebetween is temperature independent.

5. A hot spot detector according to claim 4, wherein the thermal coefficient of linear expansion and the relative thermal coefficient of refractive index are different for said secondary cores and said cladding causing said output beat phase to be independent of temperature variations.

6. A hot spot detector according to claim 4, wherein said optical fiber has a first cladding in which said input core and said secondary cores are located and a second cladding surrounding said first cladding, and wherein the thermal coefficient of linear expansion of said second cladding is different from that for said first cladding, causing the beat phase for cross-talk between said secondary cores to be substantially independent of temperature.

7. A hot spot detector according to claim 1, wherein said optical fiber includes a first cladding in which said input core and said secondary cores are located, a second cladding surrounding said first cladding, and a third cladding surrounding said second cladding, and wherein the thermal coefficient of linear expansion of said third cladding is less than the thermal coefficient of linear expansion of said second cladding, the thermal coefficient of linear expansion of said second cladding is different from that for said first cladding, and wherein said thickness of said second cladding and said third cladding are selected such that the beat phase of propagation between said secondary cores is substantially independent of temperature.

8. A hot spot detector according to claim 1, wherein said optical fiber is located adjacent said power conductor to determine the point along said cable at which a hot spot occurs.

9. A temperature level detector, comprising:
means including an optical fiber having an input core and a secondary core in a common cladding, said secondary core being shaped and positioned with respect to said input core to allow cross-talk therebetween, said input core, said secondary core and cladding being dimensioned and fabricated from materials so as to support only the lowest order mode;
source means for presenting light of a predetermined wavelength to be coupled into said input core;
detector means for receiving light of predetermined wavelength emerging from said secondary core; and
whereby if the temperature level at any point along the length of said optical fiber exceeds a preselected level, at least some of the light propagating along said input core cross-talks to said secondary core at such point, thus providing an indication that the temperature of said optical fiber has exceeded the preselected level.

* * * * *